United States Patent
Arita et al.

(10) Patent No.: US 7,283,212 B2
(45) Date of Patent: Oct. 16, 2007

(54) VEHICULAR RADAR DEVICE

(75) Inventors: Satoru Arita, Kyoto (JP); Yasutada Asada, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/528,949

(22) Filed: Sep. 28, 2006

(65) Prior Publication Data
US 2007/0064216 A1    Mar. 22, 2007

Related U.S. Application Data

(62) Division of application No. 10/894,654, filed on Jul. 20, 2004, now Pat. No. 7,158,218.

(30) Foreign Application Priority Data
Jul. 22, 2003  (JP)  ............................. 2003-277264

(51) Int. Cl.
*G01C 3/08* (2006.01)
*G01S 13/00* (2006.01)

(52) U.S. Cl. ...................... 356/5.01; 356/4.01; 356/28; 342/70

(58) Field of Classification Search ...... 356/4.01–5.15, 356/28; 342/70–72, 159; 701/1, 223, 301
See application file for complete search history.

(56) References Cited

U.S. PATENT DOCUMENTS

| | | | | |
|---|---|---|---|---|
| 6,026,353 A | * | 2/2000 | Winner | 702/183 |
| 6,927,699 B2 | * | 8/2005 | Samukawa et al. | 340/903 |
| 7,148,838 B2 | * | 12/2006 | Kakishita et al. | 342/70 |
| 2001/0039469 A1 | * | 11/2001 | Nishimura | 701/49 |
| 2002/0189875 A1 | | 12/2002 | Asanuma et al. | |
| 2003/0028291 A1 | * | 2/2003 | Matsuura | 701/1 |
| 2004/0065814 A1 | * | 4/2004 | Miyazaki et al. | 250/222.1 |
| 2005/0237385 A1 | * | 10/2005 | Kosaka et al. | 348/42 |

FOREIGN PATENT DOCUMENTS

| | | |
|---|---|---|
| DE | 40 05 919 C | 4/1991 |
| JP | 11-271469 | 10/1999 |
| JP | 2004-271404 | 9/2004 |

OTHER PUBLICATIONS

Mechanical English Translation of JP2004-271404 from esp@cenet, published Sep. 30, 2004, 15 pages.
English Patent Abstract of JP2004-271404 from esp@cenet, published Sep. 30, 2004, 1 page.

(Continued)

*Primary Examiner*—Isam Alsomiri
(74) *Attorney, Agent, or Firm*—Osha Liang LLP

(57) ABSTRACT

A vehicular radar device detects an object within a detection area on the basis of detection data having a reception intensity exceeding a predefined threshold. The detection data is contained in reflected-wave data on waves irradiated into the detection area outward of a vehicle provided with the vehicular radar device. The device is capable of varying a direction or/and a range of the detection area in a vertical direction, and setting, during a normal time, the direction or/and the range of the detection area in the vertical direction to a normal state in which the object is correctly detected, and performing a detection operation in the normal state.

7 Claims, 8 Drawing Sheets

OTHER PUBLICATIONS

Partial European Search Report dated Nov. 3, 2004, issued in European Patent Application No. EP 04 01 5251, 3 pages.
Patent Abstracts of Japan, Publication No. 08-029533, Date of Publication: Feb. 2, 1996 (2 pages).
Patent Abstracts of Japan, Publication No. 2000-065932; Date of Publication: Mar. 3, 2000.
Patent Abstracts of Japan, Publication No. 09-159765, Date of Publication: Jun. 20, 1997 (2 pages).
Patent Abstracts of Japan, Publication No. 2000-040139, Date of Publication: Feb. 8, 2000 (2 pages).
Patent Abstracts of Japan, Publication No. 2003-042757; Date of Publication: Feb. 13, 2003 (2 pages).

* cited by examiner

ROAD SURFACE AND VEHICLE LOOKING LIKE ROAD SURFACE DURING NORMAL-STATE SCANNING

VARIATION OF ROAD SURFACE DURING DOWN-STATE SCANNING

VARIATION OF VEHICLE LOOKING LIKE ROAD SURFACE DURING DOWN-STATE SCANNING

RAINFALL 30mm TARGET 20m

RAINFALL 30mm TARGET 40m

VEHICULAR RADAR DEVICE

CROSS-REFERENCE TO RELATED APPLICATIONS

This is a divisional of U.S. patent application Ser. No. 10/894,654 filed on Jul. 20, 2004 now U.S. Pat. No. 7,158,218.

BACKGROUND OF THE INVENTION

1. Field of the Invention

The present invention relates to a vehicular radar device installed on, for example, a vehicle and operative to detect the presence or absence of a preceding vehicle or the like and position information on the same by using electromagnetic waves such as laser light.

2. Description of the Related Art

Wide advances have heretofore made in the development of radars to be used in vehicles for purposes such as monitoring of forward obstacles and adaptive cruise control (vehicular radar devices), and a radio wave system and a laser system are known. Each of these systems is constructed to transmit an electromagnetic wave such as a radio wave or laser light toward an object within a predetermined detection area, and finds the distance to the target from a reception delay time which elapses until the radar receives a reflected wave of the electromagnetic wave. There is also another system which detects the direction and the like of a target by transmitting an electromagnetic wave while scanning it.

In such a vehicular radar device, as a matter of course, rain, snow, fog and the like as well as a road surface need to be detected in the state of being discriminated from a vehicle and the like, so that their measured data are eliminated from monitoring targets to prevent rain, snow, fog and the like as well as a road surface from being erroneously detected as a monitoring target (such as an objective vehicle or an obstacle).

In addition, since this kind of vehicular radar device (a laser radar in particular), when it is influenced by rain, snow, fog or the like, suffers a lowering in detection distance performance, rain or the like needs to be detected in the state of being discriminated from a vehicle or the like which is a monitoring target. As shown in FIG. 7A by way of example, when the detection distance performance of a radar device provided in a vehicle C1 is lowered by unfavorable weather such as rain, the radar device will not be able to detect a preceding vehicle C2, until the distance of the preceding vehicle C2 from the vehicle C1 approaches a position which lies at a shorter distance as shown by symbol C3. Accordingly, in this situation, it is desirable to take measures such as the processing of making the transmission power and the reception sensitivity of the radar device higher than those under normal conditions so as to maintain the distance performance at approximately the same level as that under normal conditions, or the processing of outputting a warning informing a driver that the distance performance has lowered.

FIG. 8B shows data obtained by actually measuring a received light waveform in the case where a predetermined target is installed at a short distance (20 m) under unfavorable weather conditions entailing a rainfall of 30 mm per hour (in FIG. 8A, the horizontal and vertical axes represent distance (m) and received light quantity, respectively). FIG. 8C shows data obtained by similarly actually measuring a received light waveform in the case where a predetermined target is installed at a long distance (40 m) under similar unfavorable weather conditions. It can be seen from FIGS. 8B and 8C that under the unfavorable weather conditions, the waveform of the target installed at the short distance exceeds the threshold of the received light quantity and can be detected, whereas the waveform of the target installed at the long distance does not exceed the threshold of the received light quantity and cannot be detected, so that the detection distance performance becomes low under the unfavorable weather conditions. The threshold is preset on the basis of experiments and the like so that erroneous detection due to noise can be eliminated.

To meet this demand, Patent Document 1 (Japanese Patent No. 2,776,253) proposes a laser radar which makes a decision as to reflected light from fog or the like on the basis of a received waveform.

Patent Document 2 (JP-A-2000-65932) proposes a vehicular optical radar device which determines that a detection target is snow or fog, when it is recognized that the distance of the detection target is approximately the same over a predetermined range of scanning angles (or it is recognized that the relative speed of the detection target is zero).

Patent Document 3 (JP-A-9-159765) proposes a vehicular radar device which sets reference data on the basis of measured data determined to contain no reflected light from an object and corrects measured data on the basis of this reference data, thereby extracting only reflected light of the object from measured data including scattered light due to snow or waterdrops.

Patent Document 4 (JP-A-2000-40139) proposes a method of recognizing an object ahead of a vehicle, which prevents a non-monitoring target such as splashes from being detected, as by relatively lowering the output level of and reception sensitivity to a transmitted wave in a region where there is a low possibility that a monitoring target such as a vehicle may exist.

Patent Document 5 (JP-A-2003-42757) proposes a vehicular distance measuring device which determines whether a detection target is a road surface, on the basis of a detected distance and a received waveform (a feature quantity of reflected light).

SUMMARY OF THE INVENTION

However, the above-mentioned related arts have the problem that a road surface which does not greatly influence the detection distance performance cannot be discriminated from rain or the like, so that it is difficult to make a correct decision as to the state in which the detection distance performance is deteriorated by rain or the like.

As shown in FIG. 7B by way of example, if road surface reflection occurs due to the mounting position or angle of a radar or due to the undulations or shape of a road surface, the road surface is erroneously determined as rain or the like and the radar erroneously determines that the detection distance performance is deteriorated, so that there is a risk that the radar itself causes problems such as erroneous outputting of the above-mentioned warning.

In addition, there is a risk that, owing to a distance range in which a monitoring target such as a vehicle exists, or because of the shape, reflectance and the like of the vehicle or the like, the radar erroneously determines the vehicle or the like as the road surface and eliminates the vehicle or the like from monitoring targets. For example, the device of Patent Document 5 determines whether the detection target is a road surface, on the basis of the detection distance and the received waveform (the feature quantity of reflected light), so that if a vehicle having a shape and a reflectance which produce a received waveform showing the above-mentioned feature quantity exists in a predetermined area, this vehicle is erroneously determined as a road surface and is erroneously eliminated from monitoring targets.

As shown in FIGS. 7C and 7D by way of example, in the case where there is a difference between the radar installation height of the vehicle C1 (C5) and the height of a preceding vehicle C4 (C6), if the distance between the vehicle C1 (C5) and the preceding vehicle C4 (C6) becomes extremely short, laser light fails to illuminate the preceding vehicle C4 (C6) to a sufficient extent, and the light waveform received from the preceding vehicle C4 (C6) assumes a received light waveform (with a small received light quantity and a comparatively wide range of distribution) which is similar to the light waveform shown in FIG. 8A, which is received from the road surface or the like as will be described later. For this reason, even with the method of making a decision as to a detection target on the basis of a received light waveform (including a detection distance), it is impossible to positively discriminate between a road surface and a vehicle during detection.

FIG. 8A shows data examples of received light waveforms of a road surface and rain or the like as well as a vehicle (preceding vehicle). As shown, since the received light waveform of the vehicle is only distributed in a particular range with a comparatively large received light quantity, the vehicle and rain or the like which tends to be distributed over a wide range with a small received light quantity can be discriminated from each other to a certain extent owing to the difference between their received light waveforms (including the difference between their detection distances). However, the received light waveforms of the road surface and rain or the like have remarkably similar features, so that it is extremely difficult to discriminate between the road surface and rain or the like on the basis of the difference between the received light waveforms. In addition, as described above, there is a case where the light quantity received from the vehicle, owing to the shape or reflectance thereof, becomes small and the received light waveforms of the road surface and the vehicle become remarkably similar to each other. Accordingly, it is also difficult to positively discriminate between the road surface and the vehicle on the basis of the difference between the received light waveforms.

The invention, therefore, provides a vehicular radar device capable of detecting rain or the like or a road surface by discriminating the rain or the like or the road surface and others.

A first vehicular radar device according to the invention is a vehicular radar device which detects an object such as an objective vehicle within a detection area on the basis of detection data having a reception intensity exceeding a predefined threshold, the detection data being contained in reflected-wave data on waves irradiated into the detection area outward of a vehicle provided with the vehicular radar device. The vehicular radar device includes control processing means capable of varying a direction or/and a range of the detection area in a vertical direction, and the control processing means is operative to set, during a normal time, the direction or/and the range of the detection area in the vertical direction to a normal state in which the objective vehicle is correctly detected, and perform a detection operation in the normal state, and is operative to perform, during a rain decision time for making a decision as to rain or the like, a detection operation in an up state in which the direction or/and the range of the detection area is shifted comparatively upwardly in the vertical direction so that at least a road surface is not detected, and determine that, from among detection data obtained during the up state, detection data which does not vary in reception intensity nor in reception delay time for a predefined time is detection data relative to rain or the like.

A second vehicular radar device according to the invention is a vehicular radar device similar to the first vehicular radar device and including control processing means capable of varying a direction or/and a range of the detection area in a vertical direction. The control processing means is operative to set, during a normal time, the direction or/and the range of the detection area in the vertical direction to a normal state in which the objective vehicle is correctly detected, and perform a detection operation in the normal state, and is operative to perform, during a road-surface decision time for making a decision as to a road surface, a detection operation in a down state in which the direction or/and the range of the detection area is shifted comparatively downwardly in the vertical direction so that the road surface is correctly detected, and determine that, from among detection data obtained during the down state, detection data which varies in reception delay time compared to a detection operation in an immediately previous normal state is detection data relative to the road surface.

The term "rain or the like" signifies objects other than a monitoring target and a road surface, which are detected under unfavorable weather or the like, and includes at least rain, snow, fog, hailstones, dust and the like.

The term "direction of detection area" signifies the direction of the central axis of the detection area (the visual field of the radar), and in the case of a general laser radar having a detection area spreading in a fan-shaped form, the term signifies the direction of a so-called optical axis. The term "range of detection area" signifies the width size of the detection area which spreads from its central axis on the opposite sides thereof, and in the case of a general laser radar, the term signifies an angular range centered at the optical axis. The term "vertical direction" signifies a direction which is vertical to a road surface on which a vehicle runs. The term "normal time" signifies a time which is not the rain decision time nor the road surface decision time. The term "normal state in which objective vehicle is correctly detected" generally signifies the state in which the central axis of the detection area is approximately parallel to (i.e., approximately horizontal with respect to) the road surface, and the range of a predetermined angle spreading vertically in the opposite directions from that central axis constitutes the detection area spreading in the vertical direction. The term "reception delay time" signifies the distance data to a target which is measured by the radar.

According to the first vehicular radar device of the invention, the control processing means, during the rain decision time, shifts the visual field of the radar into the up state and makes a decision as to rain or the like. Namely, from among detection data obtained during the up state, detection data which satisfies the condition that the reception intensity and the reception delay time (distance data) do not vary for a predefined time is determined as detection data relative to rain or the like. Accordingly, it is possible to highly reliably discriminate between rain or the like and others (including a road surface, an objective vehicle and the like), and it is possible to highly appropriately execute processing based on this discrimination (for example, the processing of issuing a warning to a user).

The reason for this is as follows. When the visual field of the radar is shifted to the up state (the state in which at least the road surface is out of the visual field), data components relative to at least the road surface do not appear as detection data, as shown in FIG. 5B by way of example. At this time, as the result of the shift of the visual field, data components relative to an objective vehicle or the like decrease in reception intensity or do not appear as detection data, as shown in FIG. 5B by way of example. In addition, even if there remains a data component relative to the objective vehicle or the like, this data is eliminated in the decision based on the above-mentioned condition, because as observation is performed for a given time period, the received light quantity and the distance data necessarily vary with the running of the vehicle. However, data relative to unfavorable weather such as rain, even if it is observed for the given time period, is observed at approximately the same distance with an approximately constant received light quantity (i.e., with approximately the same waveform) as shown in FIG. 5C by way of example. Accordingly, through the above-described decision, only the detection data relative to rain or the like can be positively recognized in the state of being discriminated from the road surface and the objective vehicle or the like.

Incidentally, if the up state is the state in which the direction or/and the range of the detection area is shifted upwardly in the vertical direction so that the road surface and the objective vehicle are not detected, the objective vehicle or the like as well as the road surface positively is not detected, and the condition "detection data whose do not vary in reception intensity nor in reception delay time for a predefined time" is not necessarily necessary. Accordingly, it is also possible to adopt a construction which unconditionally determines detection data obtained during the up state, as detection data relative to rain or the like, or a construction which makes a decision based on only a decision using the feature quantity of a received waveform.

According to the second vehicular radar device of the invention, the control processing means, during the road surface decision time, shifts the visual field of the radar into the down state and makes a decision as to the road surface. Namely, from among detection data obtained during the down state, detection data which satisfies the condition that the reception delay time (distance data) varies compared to a detection operation in an immediately previous normal state is determined as detection data relative to the road surface.

Accordingly, it is possible to highly reliably discriminate between the road surface and others (including rain or the like and an objective vehicle or the like), and it is possible to highly appropriately execute processing based on this discrimination (for example, the processing of issuing a warning to a user, the processing of eliminating data relative to the road surface).

The reason for this is as follows. During the down state (the state in which the road surface is detected as a closer object), as the result of the shift of the visual field, data components relative to the road surface increase in reception intensity and the distance data necessarily varies to indicate a closer distance, as shown in FIG. 6B by way of example. However, as shown in FIG. 6C by way of example, the data relative to the objective vehicle or the like or rain or the like may slightly decrease in reception intensity, but is observed at approximately the same distance. Accordingly, through the decision based on the above-mentioned condition, only the detection data relative to the road surface can be positively recognized in the state of being discriminated from rain, the objective vehicle and the like.

It is to be noted that, during the above-mentioned road-surface decision, only detection data which, as the result of the shift to the down state, varies in the direction in which the reception delay time becomes shorter (the distance becomes shorter) may be determined as detection data relative to the road surface. In this case, if there is detection data which varies in the direction in which the reception delay time becomes longer (data relative to an object other than the road surface, for example, data relative to noise), this detection data is eliminated, whereby it is possible to make a decision as to data relative to the road surface with far higher reliability.

In addition, during the above-mentioned road-surface decision, only detection data whose reception delay time is within a predefined range (detection data which is within a predefined distance range) may also be determined as detection data relative to the road surface. In this case as well, since the road surface is detected in only a given range near the vehicle on which the radar is installed, compared to the objective vehicle or the like, it is possible to make a decision as to data relative to the road surface with far higher reliability.

A preferred embodiment of the invention provides a construction in which when the control processing means is to make a decision as to detection data relative to rain or the like or the road surface during the above-described up state or down state, a target decision based on the feature quantity of a received waveform is first performed (a decision based on a comparison between the feature quantity and a previously registered reference value), and only when it is determined that there exists detection data presumed to be relative to rain or the like or the road surface, the above-mentioned decision (the decision based on the above-mentioned condition) is made.

This embodiment provides the advantage that, through a comparatively simple target decision, after it has been confirmed whether the above-mentioned decision is necessary, the decision can be performed only when necessary, so that useless decision processing can be avoided.

Another preferred embodiment of the invention provides a construction in which when the control processing means is to make a decision as to detection data relative to rain or the like or the road surface during the above-described up state or down state, a target decision based on the feature quantity of a received waveform is first performed, and detection data which is positively not relative to rain or the like or the road surface is eliminated from decision targets, whereby the decision processing can be made simple.

In addition, the above-mentioned rain decision time or road surface decision time may be a time immediately after a predefined interval time elapses (namely, it is also possible to adopt a construction which periodically executes the operation of shifting the visual field into the up state to make a decision as to rain or the like or the operation of shifting the visual field into the down state to make a decision as to the road surface). Preferably, the following construction is adopted.

Namely, it is possible to adopt a construction in which the rain decision time or the road surface decision time is a time at which when a target decision based on a feature quantity of a received waveform is performed on the detection data obtained through the detection operation in the normal state, the result of the target decision shows that there exists detection data presumed to be relative to the road surface or rain or the like. In this case, there is the advantage that a decision based on a shift of the visual field is made only when necessary and a decision as to the road surface or rain or the like is efficiently executed, whereby it is possible to prevent power consumption or the like due to useless operations (such as an unnecessary shift of the visual field).

According to the vehicular radar device of the invention, it is possible to highly reliably make a decision as to rain or the like or a road surface by discriminating between rain or the like on the road surface and others (including an objective vehicle and the like), whereby it is possible to highly appropriately execute processing based on this decision (for example, the processing of issuing a warning to a user, or the processing of eliminating data relative to the road surface).

BRIEF DESCRIPTION OF THE DRAWINGS

The invention will become more readily appreciated and understood from the following detailed description of a preferred embodiment of the invention when taken in conjunction with the accompanying drawings, in which.

DETAILED DESCRIPTION OF THE INVENTION

A preferred embodiment of the invention will be described below with reference to the accompanying drawings.

Figure 1A:
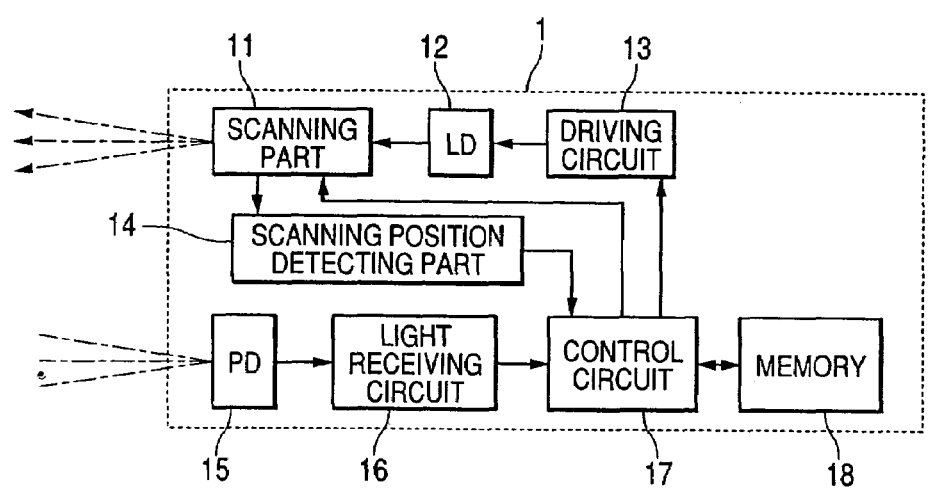
FIGS. 1A and 1B are views aiding in describing the construction and the like of a vehicular radar device according to the preferred embodiment of the invention.
Figure 1B:
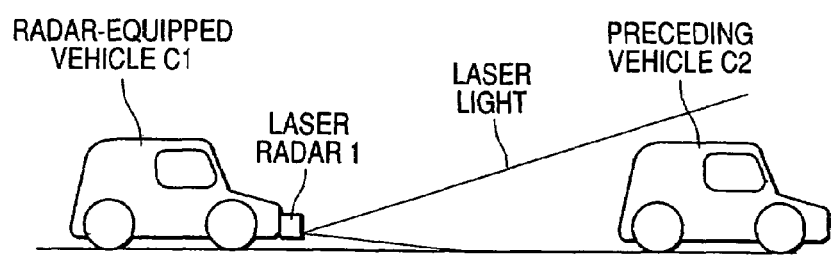

FIGS. 1A and 1B are views aiding in describing a vehicular radar device according to the preferred embodiment of the invention. FIG. 1A is a view showing the construction of the device, while FIG. 1B is a view showing an example in which the vehicular radar device is installed on a vehicle.

In FIG. 1A, the vehicular radar device (in this embodiment, a pulse-echo type of laser radar) is denoted by reference numeral 1. This vehicular radar device 1 has a scanning part 11, an LD (laser diode) 12, a driving circuit 13, a scanning position detecting part 14, a PD (photodiode) 15, a light receiving circuit 16, a control circuit 17, and a memory 18.

The control circuit 17 corresponds to control processing means in the invention. The scanning device 11, the LD 12 and the driving circuit 13 constitute transmitting means of the vehicular radar device 1, and the PD 15 and the light receiving circuit 16 constitute receiving means of the vehicular radar device 1. The scanning device 11, the LD 12 and their associated optical system (not shown) correspond to a transmitting head of the vehicular radar device 1, while the PD 15 and its associated optical system (not shown) correspond to a receiving head of the vehicular radar device 1.

The scanning device 11 is operative to transmit laser light outputted from the LD 12, while scanning the laser light within a predetermined angular range (scanning area) at least in the horizontal direction by means of a reflecting mirror or the like which is swingably driven, and operates with predetermined timing at a predetermined period under the control of the control circuit 17. The scanning speed may be a constant speed. The scanning area is generally set to be slightly wider than a detection area in which measurement is to be performed.

The driving circuit 13 is a circuit which is controlled by the control circuit 17 and causes the LD 12 to operate-to output laser light (laser pulses) at emission timing intervals generated by the control circuit 17. This emission timing is preset, to obtain the predetermined resolution, so that emission and reception of laser light is performed at least once in each of detection regions formed by dividing the scanning area by a predetermined width in the scanning direction. The emission period of laser light may be constant.

The scanning position detecting device 14 is an element which detects the scanning direction of the scanning device 11 and inputs the resultant signal (scanning direction signal) to the control circuit 17.

Figure 5A:
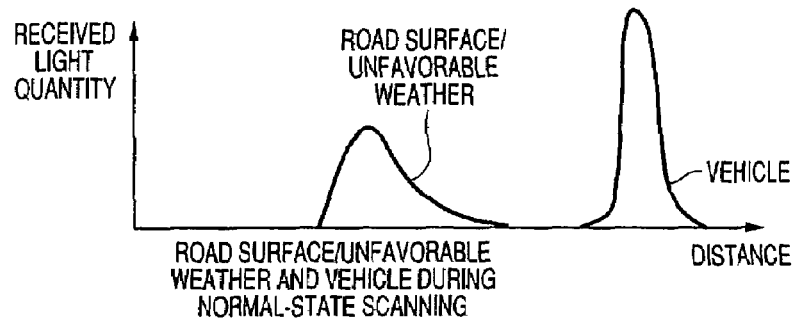
FIGS. 5A to 5C are views showing variations of detection data due to a shift of the visual field to an up state.

The PD 15 is operative to receive reflected light which returns from a target when the transmitted laser light is reflected therefrom, and outputs an electrical signal corresponding to a received light quantity (received light intensity) (the electrical signal is hereinafter referred to as the received light quantity signal). The received light quantity signal outputted from the PD 15 is inputted into the light receiving circuit 16, and is processed in the light receiving circuit 16 and the control circuit 17. Namely, the received light quantity signal is read at a sampling period corresponding to the emission timing, for example, only for a constant time after emission, and data indicative of a received light quantity corresponding to a delay time (distance) is generated as shown in FIG. 5 by way of example (the data corresponds to reflected wave data in the invention and is hereinafter referred to as the received light waveform data). For example, in the case where transmission and reception of laser light is performed in the above-mentioned detection region by a plurality of times (a plurality of received light waveform data are obtained for one detection region), the received light waveform data are integrated for each detection region and are stored in the memory 18 as data indicative of received signals for each detection region.

Since how many times transmission and reception of laser light is to be performed in one detection region influences basic detection sensitivity (detection sensitivity in a reference area), the number of times is determined on the basis of conditions such as light projection power, the extent of spreading of a projected light beam and the reflectance of a detection target so that the detection target can be positively detected without erroneous detection, for example, under good circumstances.

As shown in FIG. 1B by way of example, the vehicular radar device 1 is installed on a vehicle C1, and is operative to irradiate laser light into a forward scanning area of the vehicle C1 and detect a preceding vehicle C2 and others (including an obstacle) which exist in the detection area within the scanning area.

The vehicular radar device 1 is capable of varying, under the control of the control circuit 17, the vertical position of the central axis (i.e., the optical axis) of the detection area (a visual field) (i.e., the direction of the visual field in the vertical direction), or the vertical spreading angle of the detection area (i.e., the range of the visual field in the vertical direction). For example, the vehicular radar device 1 is provided with a mechanism for varying the mounting angle of a part including the transmitting head or the receiving head, and is constructed so that the control circuit 17 drives and controls this mechanism. Otherwise, the vehicular radar device 1 may also be of the type which performs scanning in the vertical direction as well and has a construction in which the scanning area in this vertical direction can be varied by the control circuit 17 mechanically or by software and the settings of the detection area within this scanning area can be changed by the control circuit 17.

Figure 4A:
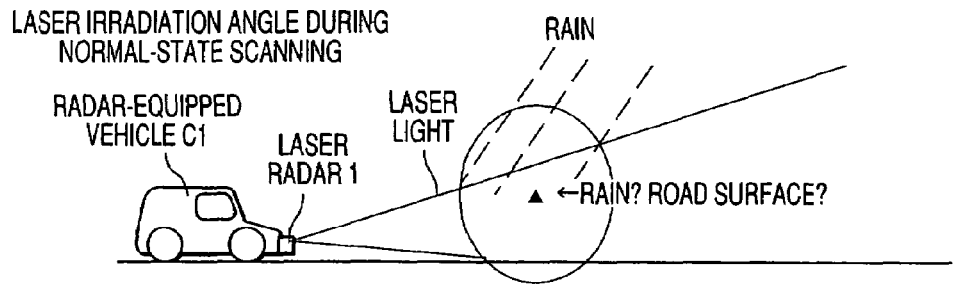
FIGS. 4A to 4D are views aiding in describing shifts of the visual field of the vehicular radar device.
Figure 4B:
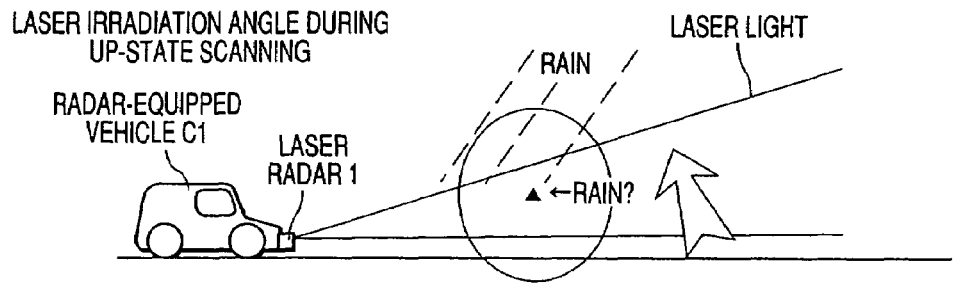
Figure 4C:
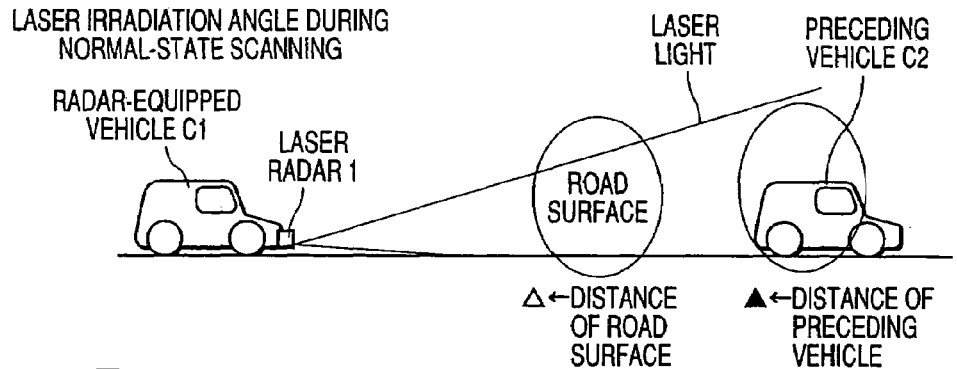
Figure 4D:
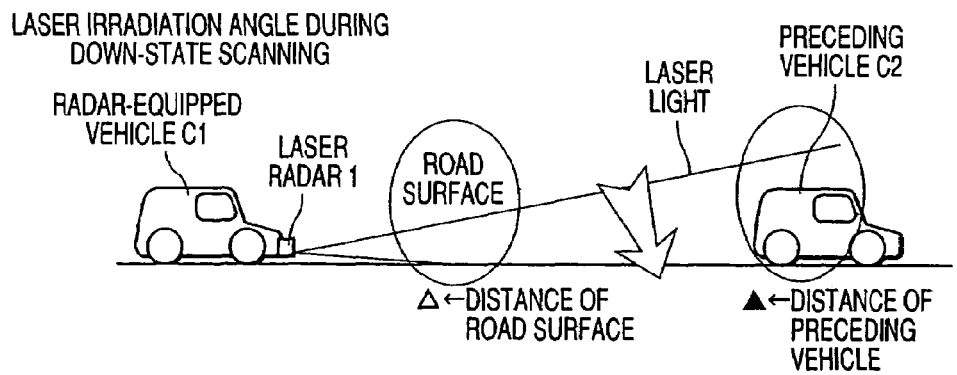

In the case of this embodiment, specifically, the vehicular radar device 1 can be selectively set to a normal state in which the optical axis is approximately horizontal as shown in FIG. 4A (its scanning mode is set to normal), an up state in which the optical axis is inclined upwardly as shown in FIG. 4B (the scanning mode is set to up), and a down state in which the optical axis is inclined downwardly as shown in FIG. 4D (the scanning mode is set to down). The up state is a state in which the optical axis is inclined upwardly to such an extent that at least a road surface lies outside the detection area (below the detection area) (or, a state in which the lower side of the angular range of the visual field is restricted to a narrow range).

Figure 2:
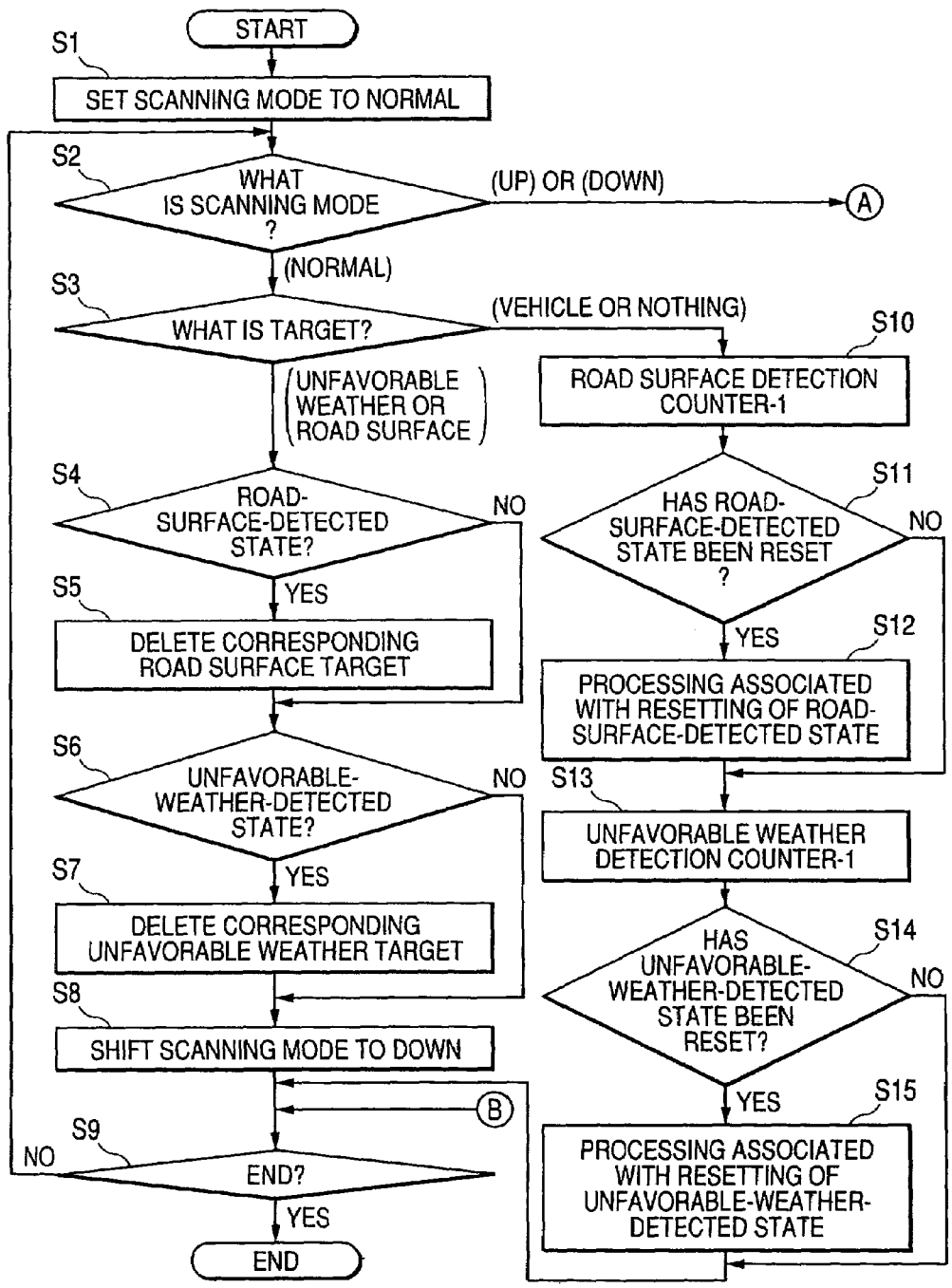
FIG. 2 is a flowchart showing an essential portion of the control processing of the vehicular radar device.
Figure 3:
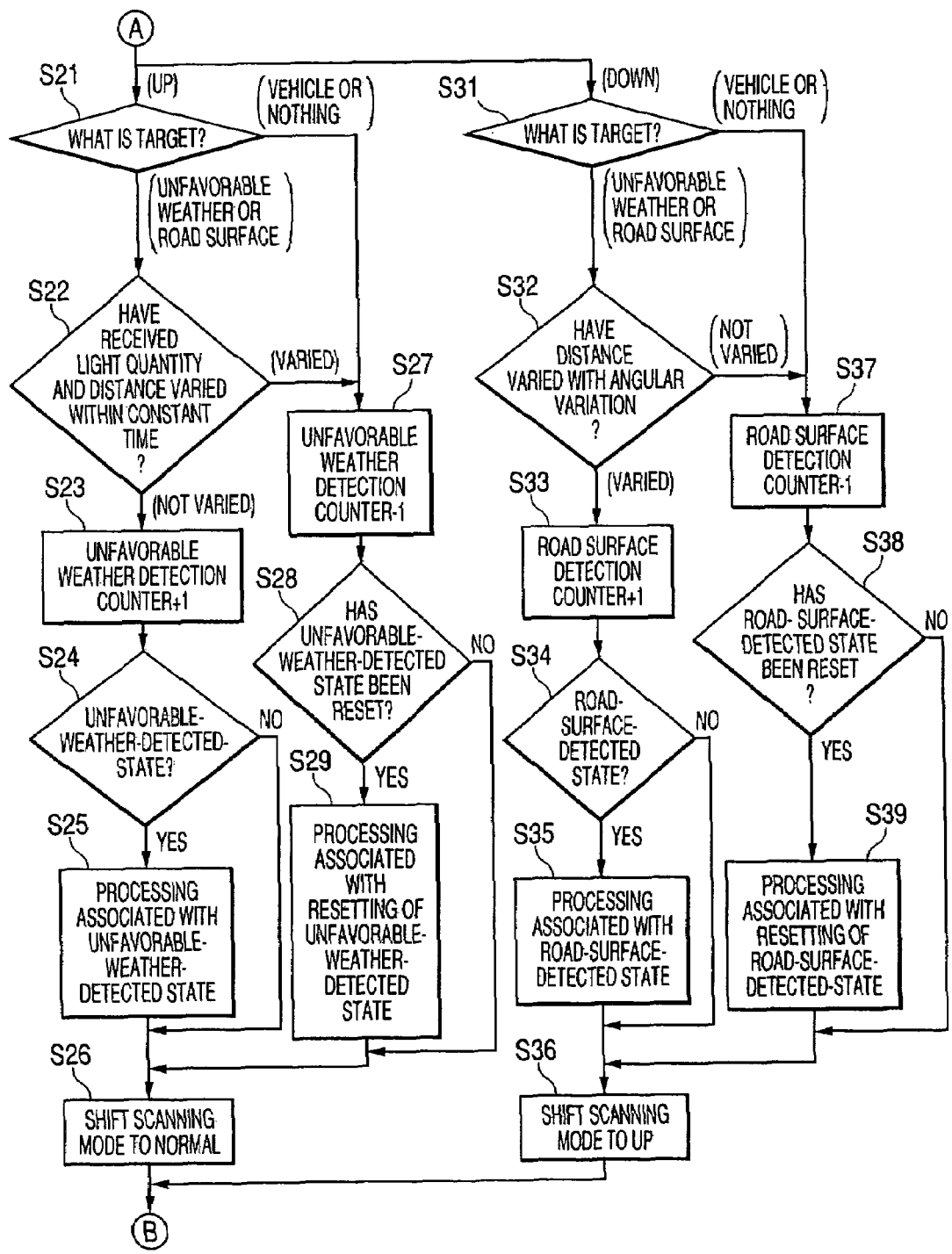
FIG. 3 is a flowchart showing an essential portion of the control processing of the vehicular radar device.

The control circuit 17 is a circuit including a microcomputer made of a CPU, a ROM, a RAM and the like, and determines whether detection data is relative to unfavorable weather or the road surface, and realizes adaptive processing for the unfavorable weather or the road surface, for example, through the process shown in the flowchart of FIGS. 2 and 3. This process will be described below.

In the control circuit 17, when the process is started, the scanning mode is set to normal in Step S1. Then, in Step S2, it is determined which of the scanning modes is set at this point in time. If the scanning mode is set to normal, the process proceeds to Step S3, if the scanning mode is set to up, the process proceeds to Step S21, or if the scanning mode is set to down, the process proceeds to Step S31.

In Step S3, the control circuit 17 analyzes, for each detection region, received light waveform data obtained by newly performing scanning (detection operation) at least once in the normal state, and discriminates between a road surface (or unfavorable weather) and a vehicle by an existing discrimination method using the feature quantities of waveforms (for example, a discrimination method of Patent Document 5 which compares feature quantities with previously registered quantities). If the unfavorable weather (such as rain) or the road surface is detected, the process proceeds to Step S4; otherwise (if only the vehicle or the like is detected, or if a target is detected), the process proceeds to Step S10.

In Step S4, it is determined whether a road-surface-detected state is set, and if the road-surface-detected state is set, the process proceeds to Step S5; otherwise, the process proceeds to Step S6. The road-surface-detected state is set when a road surface detection counter which is made to count up in Step S33 (FIG. 3) to be mentioned later reaches a predefined value.

Then, in Step S5, detection data which has been determined as data relative to the road surface is deleted (i.e., excluded from targets to be monitored for the purposes of cruise control and the like), and the process proceeds to Step S6.

Then, in Step S6, it is determined whether an unfavorable-weather-detected state is set, and if the unfavorable-weather-detected state is set, the process proceeds to Step S7; otherwise, the process proceeds to Step S8. The unfavorable-weather-detected state is set when an unfavorable weather detection counter which is made to count up in Step S23 (FIG. 3) as will be described later reaches a predefined value.

Then, in Step S7, detection data which has been determined as data relative to the unfavorable weather (detection data relative to rain or the like) is deleted (i.e. excluded from targets to be monitored for the purposes of cruise control and the like), and the process proceeds to Step S8.

Then, in Step S8, the scanning mode is shifted to down (i.e., the visual field is shifted to a down state), and the process proceeds to Step S9.

In Step S9, it is determined whether a predetermined end condition has been satisfied, and if the end condition has been satisfied, the process is brought to an end. If the end condition has not been satisfied, the process returns to Step S2 with predetermined timing corresponding to, for example, the execution period of scanning, and repeats the processing. The end condition is a condition which causes the vehicular radar device 1 to stop its radar operation; for example, the vehicle stops running, or the ignition key is off.

When the process proceeds to Step S10, if the count value of the road surface detection counter is not "0", the road surface detection counter is decremented by one, and the process proceeds to Step S11.

Then, in Step S11, it is determined whether the road-surface-detected state which is the result of the subtraction processing of Step S10 has been reset (for example, the road surface detection counter has been reset to "0"). Then, if it is determined that the road-surface-detected state has been reset, processing associated with the resetting of the road-surface-detected state is executed in Step S12, and then the process proceeds to Step S13. Otherwise, the process directly proceeds to Step S13.

The processing associated with the resetting of the road-surface-detected state is, for example, the processing of stopping the outputting of a warning which is to be outputted to a user (driver) during the road-surface-detected state.

Then, in Step S13, if the count value of the unfavorable weather detection counter is not "0", the unfavorable weather detection counter is decremented by one, and the process proceeds to Step S14.

Then, in Step S14, it is determined whether the unfavorable-weather-detected state which is the result of the subtraction processing of Step S13 has been reset (for example, the unfavorable weather detection counter has been reset to "0"). Then, if it is determined that the unfavorable-weather-detected state has been reset, processing associated with the resetting of the unfavorable-weather-detected state is executed in Step S15, and then the process proceeds to Step S9. Otherwise, the process directly proceeds to Step S9.

The processing associated with the resetting of the unfavorable-weather-detected state is, for example, the processing of stopping the outputting of a warning which is to be outputted to the user (driver) during the unfavorable-weather-detected state. Otherwise, the processing may also include the processing of resetting the setting of making detection performance (transmission power and reception sensitivity) higher than normal performance, during the unfavorable-weather-detected state.

On the other hand, if the process proceeds to Step S21 in the branch processing of Step S2 (the scanning mode is set to up), in Step S21, the control circuit 17 analyzes, for each detection region, received light waveform data obtained by newly performing scanning at least once in the up state, and discriminates between the road surface (or the unfavorable weather) and the vehicle similarly to Step S3. If the unfavorable weather or the road surface is detected, the process proceeds to Step S22; otherwise, the process proceeds to Step S27.

In Step S22, scanning is again performed if necessary, and it is determined whether the detection data (received light quantity or/and distance) which has been determined as data indicative of the road surface or the like in Step S21 has varied by an amount not smaller than a predefined amount within a constant time period (i.e., during the execution of a plurality of detection operations). If the detection data has not varied, it is determined that the detection data is relative to the unfavorable weather, and the process proceeds to Step S23. Otherwise, it is determined that the detection data is relative to the vehicle or the like, and the process proceeds to Step S27. Incidentally, if it is determined in Step S22 that the detection data is relative to the unfavorable weather, the detection data is deleted in the above-mentioned Step S7 which is executed after Step S22.

Then, in Step S23, the count value of the unfavorable weather detection counter is incremented by one, and the process proceeds to Step S24.

Then, in Step S24, it is determined whether the unfavorable-weather-detected state which is the result of the addition processing of Step S23 has been set (for example, the unfavorable weather detection counter has been set to a predefined value larger than "0"). Then, if it is determined that the unfavorable-weather-detected state has been set, the process proceeds to Step S25. Otherwise, the process proceeds to Step S26.

Then, in Step S25, processing associated with the unfavorable-weather-detected state is executed, and the process proceeds to Step S26. The processing associated with the unfavorable-weather-detected state is, for example, the processing of outputting a warning to the user (driver) during the unfavorable-weather-detected state, or the processing of making detection performance (transmission power and reception sensitivity) higher than normal performance during the unfavorable-weather-detected state.

Then, in Step S26, the scanning mode is shifted to normal (i.e., the visual field is shifted to a normal state), and the process proceeds to Step S9.

When the process proceeds to Step S27, if the count value of the unfavorable weather detection counter is not "0", the unfavorable weather detection counter is decremented by one, and the process proceeds to Step S28.

Then, in Step S28, it is determined whether the unfavorable-weather-detected state which is the result of the subtraction processing of Step S27 has been reset (for example, the unfavorable weather detection counter has been reset to "0"). Then, if it is determined that the unfavorable-weather-detected state has been reset, the processing associated with the resetting of the unfavorable-weather-detected state is executed in Step S29, and then the process proceeds to Step S26. Otherwise, the process directly proceeds to Step S26.

On the other hand, if the process proceeds to Step S31 in the branch processing of Step S2 (the scanning mode is set to down), in Step S31, the control circuit 17 analyzes, for each detection region, received light waveform data obtained by newly performing scanning at least once in the down state, and discriminates between the road surface (or the unfavorable weather) and the vehicle similarly to Step S3. If the unfavorable weather or the road surface is detected, the process proceeds to Step S32; otherwise, the process proceeds to Step S37.

In Step S32, a comparison is made between the detection data which has been determined as data indicative of the road surface or the like in Step S31 and detection data on the same target which has been obtained through scanning in the previous normal mode, and it is determined whether these data (received light quantity or/and distance) have varied by an amount not smaller than a predefined amount. If the detection data has varied, it is determined that the detection data is relative to the road surface, and the process proceeds to Step S33. Otherwise, it is determined that the detection data is relative to the vehicle or the unfavorable weather, and the process proceeds to Step S37. Incidentally, if it is determined in Step S32 that the detection data is relative to the road surface, the detection data is deleted in the above-mentioned Step S5 which is executed after Step S32.

Then, in Step S33, the count value of the road surface detection counter is incremented by one, and the process proceeds to Step S34.

Then, in Step S34, it is determined whether the road-surface-detected state which is the result of the addition processing of Step S33 has been set (for example, the road surface detection counter has been set to a predefined value larger than "0"). Then, if it is determined that the road-surface-detected state has been set, the process proceeds to Step S35. Otherwise, the process proceeds to Step S36.

Then, in Step S35, processing associated with the road-surface-detected state is executed, and the process proceeds to Step S36. The processing associated with the road-surface-detected state is, for example, the processing of outputting a warning to the user (driver) during the road-surface-detected state.

Then, in Step S36, the scanning mode is shifted to up (i.e., the visual field is shifted to an up state), and the process proceeds to Step S9.

When the process proceeds to Step S37, if the count value of the road surface detection counter is not "0", the road surface detection counter is decremented by one, and the process proceeds to Step S38.

Then, in Step S38, it is determined whether the road-surface-detected state which is the result of the subtraction processing of Step S37 has been reset (for example, the road surface detection counter has been reset to "0"). Then, if it is determined that the road-surface-detected state has been reset, the processing associated with the resetting of the road-surface-detected state is executed in Step S39, and then the process proceeds to Step S36. Otherwise, the process directly proceeds to Step S36.

According to the above-described sequence of processing, first, scanning (detection operation) is executed during the normal state in which the direction of the visual field is approximately horizontal, and if it is determined from the received light waveform analysis (a decision based on feature quantities) that there is data presumed to be detection data relative to the unfavorable weather (such as rain) or the road surface, the process proceeds from Step S3 to Step S8, in which the normal state is shifted to the down state in which the visual field is inclined downwardly (the scanning mode is set to down). In the next cycle, the processing for the scanning mode which is set to down (Steps S31 to S36) is executed. Then, in the last step (Step S36) of the processing for the scanning mode which is set to down, the down state is shifted to the up state in which the visual field is inclined upwardly (the scanning mode is set to up), and in the subsequent cycle, the processing for the scanning mode which is set to up (Steps S21 to S26) is executed. Then, in the last step (Step S26) of the processing for the scanning mode which is set to up, the up state is shifted to the normal state in which the direction of the visual field is approximately horizontal (the scanning mode is set to normal), and the process returns to the normal state and repeats Step S3 and the following steps.

Namely, in this embodiment, the control circuit 17 makes a target decision as to detection data obtained from a detection operation in the normal state, on the basis of a feature quantity of a received waveform (received light waveform data), and when there exists detection data presumed to be relative to a road surface, rain or the like (part of the received light waveform data) (when it is determined that there is data indicative of rain or the like, or when it is determined that there is data indicative of the road surface), the visual field is shifted to make a final decision as to the road surface or rain or the like.

The final decision as to rain or the like is made in the following manner. Namely, from among detection data obtained during the up state, detection data which does not vary for at least a predefined time in reception intensity nor in reception delay time (i.e., in received light quantity nor in distance data) is determined as detection data relative to rain or the like (Step S22).

The final decision as to the road surface is made in the following manner. Namely, from among detection data obtained during the down state, detection data showing a reception delay time (i.e., distance data) which has varied compared to a detection operation in the previous normal state is determined as detection data relative to the road surface (Step S32).

Accordingly, according to this embodiment, it is possible to highly reliably discriminate between rain or the road surface and others (such as a vehicle), and it is possible to highly appropriately execute processing based on this discrimination (for example, the processing of issuing a warning to the user).

Figure 5B:
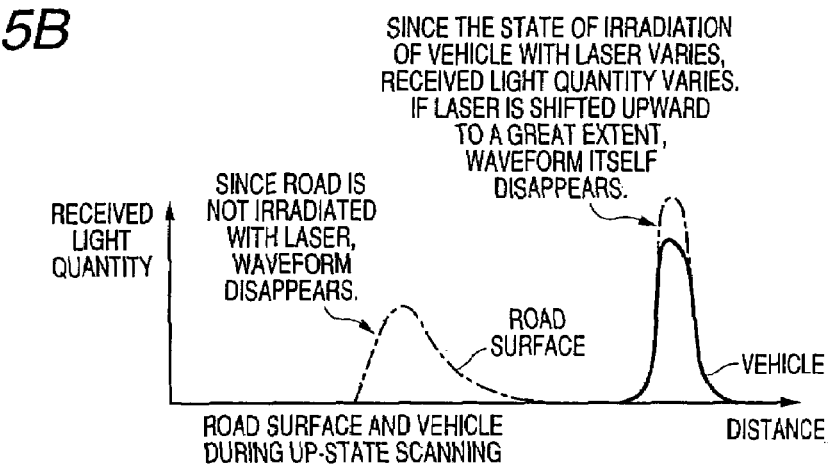
Figure 5C:
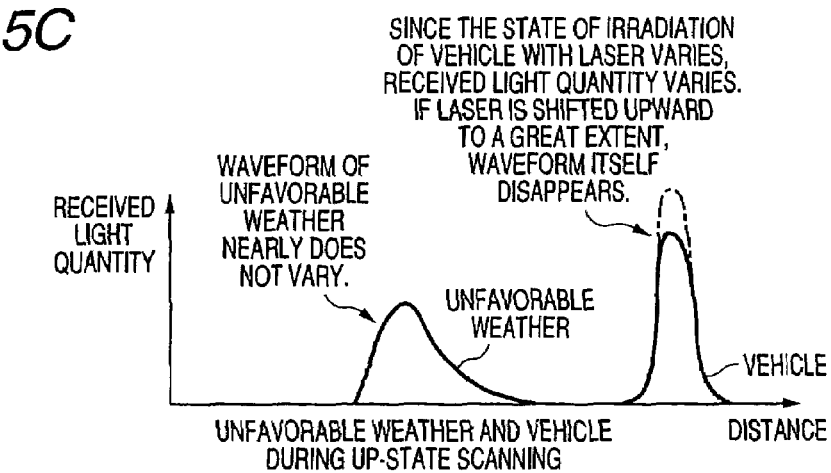

The reason for this is as follows. The decision as to rain or the like is made after the normal state shown in FIG. 4A by way of example (for example, the state in which received light waveform data such as that shown in FIG. 5A by way of example is obtained) has been shifted to the up state shown in FIG. 4A (the state in which the road surface is out of the visual field). Accordingly, data components relative to at least the road surface do not appear as received light waveform data, as shown in FIG. 5B by way of example. At this time, as the result of the shift of the visual field, data components relative to an objective vehicle or the like decrease in received light quantity (reception intensity) or do not appear as detection data, as shown in FIG. 5B by way of example. In addition, even if there remains a data component relative to the objective vehicle or the like, this data is eliminated in the decision of Step S22 mentioned above, because as observation is performed for a given time period, the received light quantity and the distance data necessarily vary with the running of the vehicle. However, data relative to unfavorable weather such as rain, even if it is observed for the given time period, is observed at approximately the same distance with an approximately constant received light quantity (i.e., with approximately the same waveform) as shown in FIG. 5C by way of example. Accordingly, through the above-described decision, only the detection data relative to rain or the like can be positively recognized in the state of being discriminated from the road surface and the objective vehicle or the like.

Figure 6A:
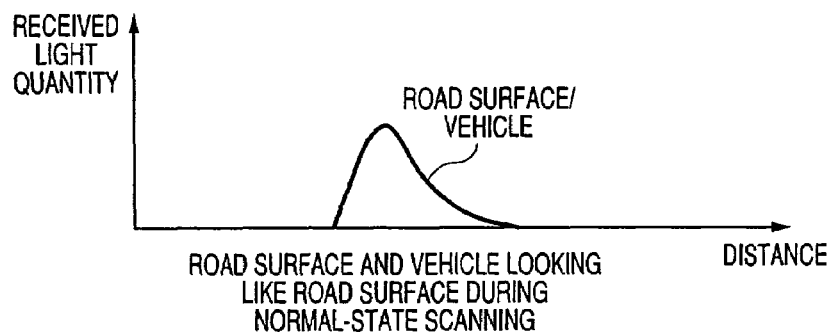
FIGS. 6A to 6C are views showing variations of detection data due to a shift of the visual field to a down state.
Figure 6B:
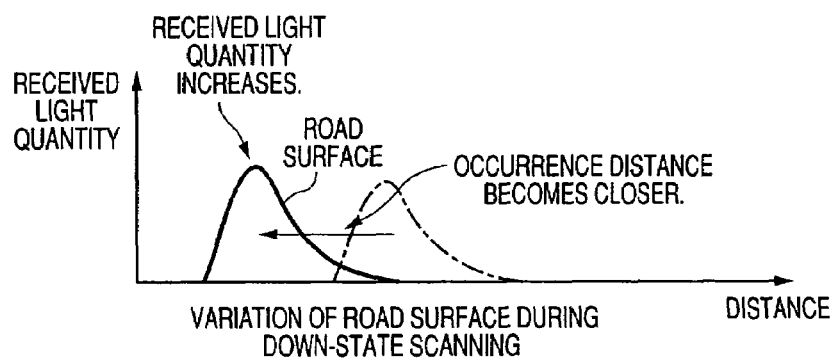
Figure 6C:
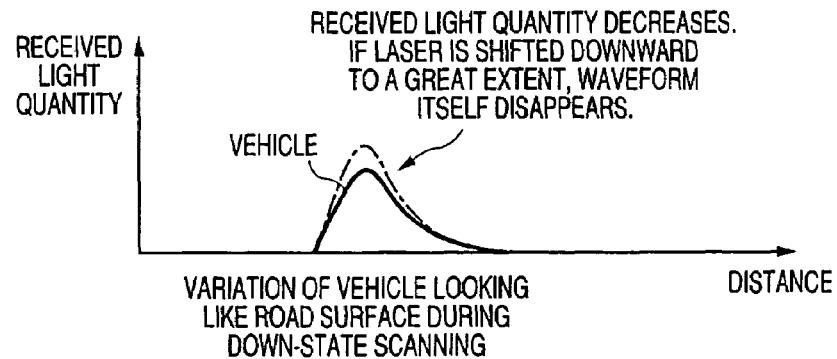
Figure 7A:
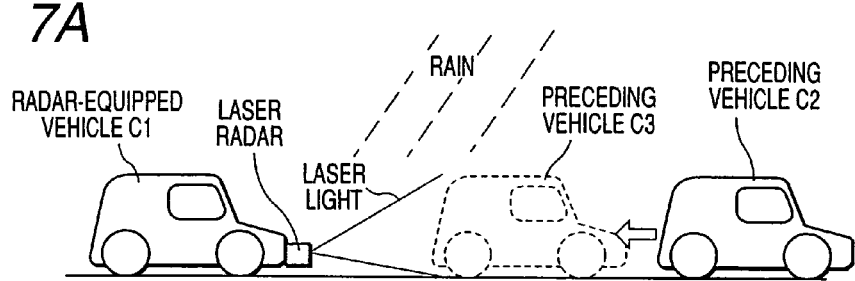
FIGS. 7A to 7D are views aiding in describing a problem of a related art (the relationship between a vehicle with a radar and an objective vehicle)
Figure 7B:
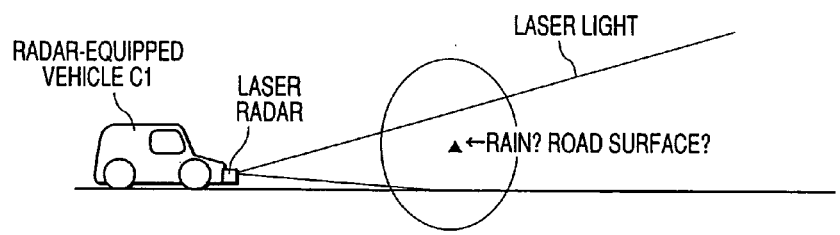
Figure 7C:
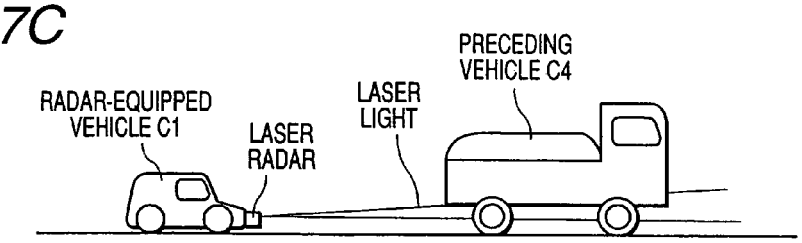
Figure 7D:
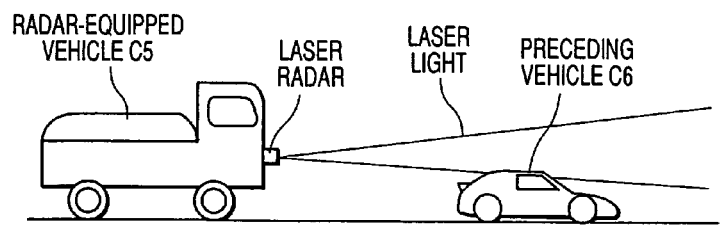
Figure 8A:
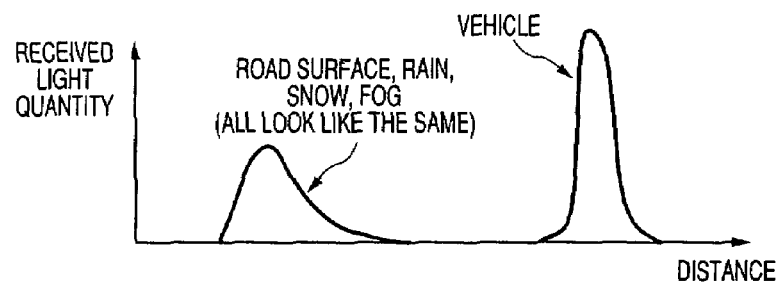
FIGS. 8A to 8C are views aiding in describing the problem of the related art (data examples).
Figure 8B:
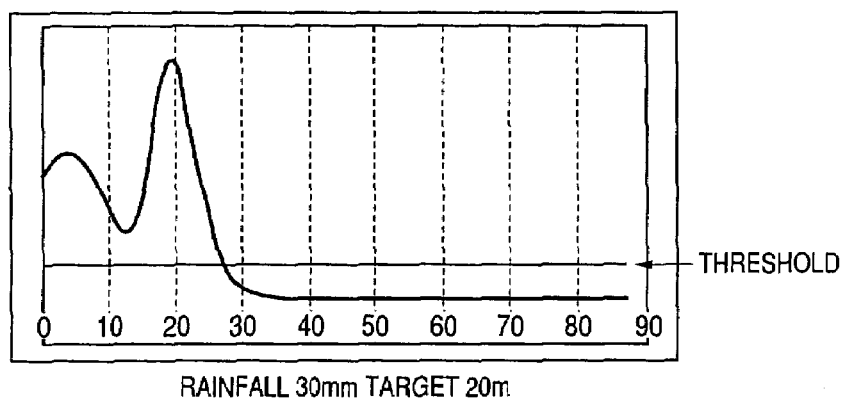
Figure 8C:
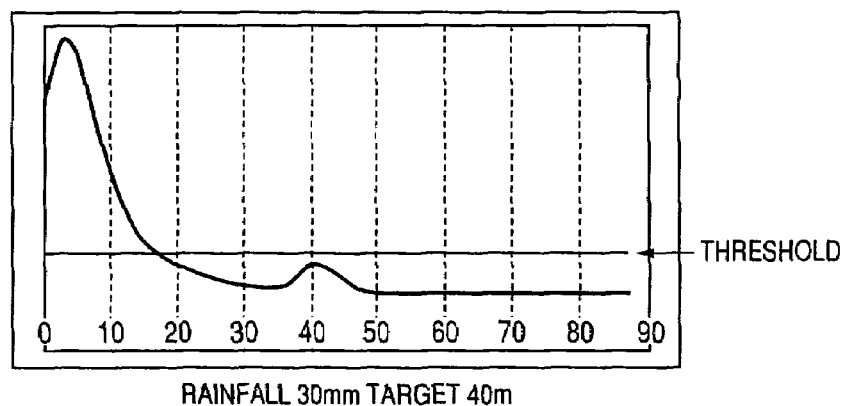

In addition, the decision as to the road surface is made after the normal state shown in FIG. 4C by way of example (for example, the state in which received light waveform data such as that shown in FIG. 6A by way of example is obtained) has been shifted to the down state shown in FIG. 4D (the state in which the road surface is detected as a closer object), on the basis of a variation in distance data before and after this shift. At this time, as the result of the shift of the visual field, data components relative to the road surface increase in received light quantity (reception intensity) and the distance data necessarily varies to indicate a closer distance, as shown in FIG. 6B by way of example. However, as shown in FIG. 6C by way of example, the data relative to the objective vehicle or the like or rain or the like may slightly decrease in received light quantity, but is observed at approximately the same distance. Accordingly, through the decision of Step S32 described above, only the detection data relative to the road surface can be positively recognized in the state of being discriminated from rain, the objective vehicle and the like.

In this embodiment, the vehicular radar device makes a target decision based on a feature quantity of a received waveform, as to detection data obtained through a detection operation in the normal state (Step S3), and when there exists detection data presumed to be relative to the road surface or rain or the like, shifts the visual field and makes the decision. Accordingly, the vehicular radar device has the advantage that it is possible to efficiently discriminate between the road surface and rain or the like by shifting the visual field only when necessary, and it is also possible to prevent power consumption or the like due to useless operations (such as an unnecessary shift of the visual field).

In this embodiment, the vehicular radar device has a construction in which in the case where it is to be determined during the above-described up state or down state whether the detection data is data relative to rain or the like or the road surface, the target decision based on the feature quantity of the received waveform is first performed (Steps S21 and S31), and only when it is determined that there exists detection data presumed to be relative to rain or the like or the road surface, the above-described decision (Steps S22 and S32) is made. Accordingly, the vehicular radar device has the advantage that, through a comparatively simple target decision (a decision based on a comparison between the feature quantity and a previously registered reference value), after it has been confirmed whether the decision (Steps S22 and S32) is necessary, the decision can be performed only when necessary, so that useless decision processing can be avoided.

In addition, in this embodiment, when it is to be determined during the up state or the down state whether the detection data is data relative to rain or the like or the road surface, the target decision based on the feature quantity of the received waveform is performed (Steps S21 and S31), and detection data which is positively not relative to rain or the like or the road surface is eliminated from decision targets (Steps S22 and S32). Accordingly, this embodiment has the advantage that the decision processing (Steps S22 and S32) is simple.

Furthermore, in this embodiment, when it is determined that the detection data is relative to the road surface or rain or the like, or when neither the road surface nor rain or the like can be detected, the associated processing (for example, the operation of outputting a warning to the user or resetting the outputting of this warning) is not immediately execute, but the associated detection counter (the road surface detection counter or the unfavorable weather detection counter) is incremented or decremented (Steps S10, S13, S23, S27, S33 and S37), and when this detection counter reaches a predefined count value, it is determined that the detected state has been set or the detected state has been reset, and the associated processing is executed (Steps S24, S28, S34, S38, S11 and S14). Accordingly, the relationship between the decision operation and the execution of the associated processing can be given an appropriate play, so that the operation can be made stable. For example, during a delicate state which alternates between detection and undetection of unfavorable weather, it is possible to avoid unpreferable unstable state in which the output state of the warning frequently alternates between on and off states.

The invention is not limited to the above-described embodiment, and various modifications and variations of the invention can be made by those skilled in the art.

For example, in the case where the direction or the angle of the visual field in the up state (the scanning mode is set to up) can be inclined upwardly to such an extent that no vehicles can be detected, decision processing such as Step S22 may also be omitted. In this case, detectable data is rain or the like with high probability. However, in this case as well, a construction which makes a final decision as to rain or the like through processing like Step S22 is advantageous in terms of the probability that a sign or a signboard which is installed above the road may be erroneously recognized as rain or the like. This is because the sign, the signboard and the like can be positively discriminated from rain or the like through the processing of Step S22.

Incidentally, the direction of the visual field which does not detect an objective vehicle or the like (an angle theta; relative to the horizontal of the central axis of the visual field) can be calculated, for example, in the following manner. Namely, assuming that the vehicle height is 2 m, the installation height of the radar head is 50 cm, the angle of the visual field is 6 degrees, and rain or the like is detected at a distance of nearly 5 m, the angle theta; ≧approximately 20 deg; (=arctan((2−0.5) divide; 5)+(6 divide; 2).

In addition, when it is to be determined whether a road surface has been detected, from a variation occurring in distance data due to a shift to the down state (the scanning mode is set to down) (for example, the decision of Step S32), only detection data which varies in the direction in which its reception delay time (i.e., distance data) becomes shorter may be determined as detection data relative to the road surface so that the reliability of the decision can be further improved.

In addition, when it is to be determined whether a road surface has been detected, only detection data whose reception delay time is within a predefined range may also be determined as detection data relative to the road surface so that the reliability of the decision can be further improved. Incidentally, the predefined range may be set to, for example, an area close to a distance at which data relative to the road surface is presumed to occur (road-surface occurrence distance). The road-surface occurrence distance can be easily estimated from the installation height of the radar head and the angle of the optical axis by using a trigonometric function.

The above-described embodiment provides a construction which executes both the operation of inclining the visual field upwardly to make a decision as to rain or the like and the operation of inclining the visual field downwardly to make a decision as to a road surface, but can also provide a construction which executes either one of these operations. Only by executing either one of the operations, it is possible to positive make a decision as to either one of a road surface and rain or the like, so that the other one can be easily discriminated by an existing decision method. For example, if the operation of inclining the visual field downwardly to make a decision as to a road surface is executed, detection data excluding detection data which is determined as data relative to the road surface can be detected by discriminating between rain or the like and a vehicle or the like, on the basis of an existing decision based on received waveforms.

In addition, it is possible to adopt a construction which, when a predefined interval time elapses (i.e., periodically), executes the operation of inclining the visual field upwardly to make a decision as to rain or the like and the operation of inclining the visual field downwardly to make a decision as to a road surface. It is also possible to adopt another construction which performs the above-described operation once each time scanning is performed by a predetermined number of times in the normal state.

Although the invention can be applied to a vehicular radar device which performs scanning in the horizontal direction (in the rightward and leftward directions) as in the above-described embodiment, the invention can also be applied to a vehicular radar device which performs scanning in the vertical direction or a vehicular radar device which performs scanning in two directions, i.e., the vertical direction and the horizontal direction. Scanning is not limited to the above-mentioned rotational operation, and may also make use of rectilinear movement (slide) of an emission part or the like.

Only the transmitting side may be constructed to perform scanning, but if the state of reception is to be maintained irrespective of the position of scanning so that a far better distance measuring operation can be performed, it is desirable that scanning be also performed on the receiving side. For example, the receiving head may be constructed to perform scanning in synchronism with the transmitting side.

The invention can be applied to not only vehicular radar devices using laser light, but also vehicular radar devices using, for example, radio waves. However, since laser light has the nature that its distance performance becomes particularly low due to rain and the like, the invention is particularly useful in application to a laser type of radar device.

What is claimed is:

1. A vehicular radar device which detects an object within a detection area on the basis of detection data having a reception intensity exceeding a predefined threshold, the detection data being contained in reflected-wave data on waves irradiated into the detection area outward of a vehicle provided with the vehicular radar device, comprising control processing means capable of varying a direction or/and a range of the detection area in a vertical direction, the control processing means being operative to set, during a normal time, the direction or/and the range of the detection area in the vertical direction to a normal state in which the object is correctly detected, and perform a detection operation in the normal state, and being operative to perform, during a road-surface decision time for making a decision as to a road surface, a detection operation in a down state in which the direction or/and the range of the detection area is shifted comparatively downwardly in the vertical direction so that the road surface is correctly detected, and determine that, from among detection data obtained during the down state, detection data which varies in reception delay time compared to a detection operation in an immediately previous normal state is detection data relative to the road surface.

2. A vehicular radar device according to claim 1, wherein the road-surface decision time is a time at which when a target decision based on a feature quantity of a received waveform is performed on the detection data obtained through the detection operation in the normal state, the result of the decision shows that there exists detection data presumed to be relative to the road surface.

3. A vehicular radar device according to claim 2, wherein the control processing means determines, as detection data relative to the road surface, only detection data which varies in a direction in which the reception delay time becomes shorter as the result of a shift to the down state.

4. A vehicular radar device according to claim 2, wherein the control processing means determines only detection data whose reception delay time is within a predefined range, as detection data relative to the road surface.

5. A vehicular radar device according to claim 1, wherein the control processing means determines, as detection data relative to the road surface, only detection data which varies in a direction in which the reception delay time becomes shorter as the result of a shift to the down state.

6. A vehicular radar device according to claim 1, wherein the control processing means determines only detection data whose reception delay time is within a predefined range, as detection data relative to the road surface.

7. A vehicular radar device according to claim 6, wherein the control processing means determines, as detection data relative to the road surface, only detection data which varies in a direction in which the reception delay time becomes shorter as the result of a shift to the down state.

* * * * *